Jan. 11, 1966    J. P. SAVAGE ET AL    3,228,776
COMPARTMENTED DEHYDRATED FOOD PACKAGE
Filed Nov. 13, 1962    3 Sheets-Sheet 1

INVENTORS:
JACK PALMER SAVAGE
GORDON ROBERT SCOTT
BY

THEIR ATTORNEYS

Jan. 11, 1966   J. P. SAVAGE ET AL   3,228,776
COMPARTMENTED DEHYDRATED FOOD PACKAGE

Filed Nov. 13, 1962   3 Sheets-Sheet 2

INVENTORS:
JACK PALMER SAVAGE
GORDON ROBERT SCOTT
BY

THEIR ATTORNEYS

Jan. 11, 1966     J. P. SAVAGE ET AL     3,228,776
COMPARTMENTED DEHYDRATED FOOD PACKAGE
Filed Nov. 13, 1962     3 Sheets-Sheet 3

INVENTORS:
JACK PALMER SAVAGE
GORDON ROBERT SCOTT
BY

THEIR ATTORNEYS

United States Patent Office 3,228,776
Patented Jan. 11, 1966

3,228,776
COMPARTMENTED DEHYDRATED
FOOD PACKAGE
Jack Palmer Savage, Bedford, and Gordon Robert Scott, Rickmansworth, England, assignors to Lever Brothers Company, New York, N.Y., a corporation of Maine
Filed Nov. 13, 1962, Ser. No. 237,261
Claims priority, application Great Britain, Nov. 14, 1961, 40,775/61
2 Claims. (Cl. 99—171)

The present invention relates to packaging dehydrated food.

According to one aspect of the present invention there is provided a container having dehydrated food therein, the volume of the container and the amount of dehydrated food being so related that the volume of water required to fill up the container whilst the food is present is that required to rehydrate the food.

According to another aspect of the present invention there is provided a packaged dehydrated meal comprising a container having a plurality of compartments containing dehydrated food, the volume of each compartment and the amount of dehydrated food in it being so related that the volume of water required to fill up the compartment whilst containing the food is that required to rehydrate the food in the compartment.

A dehydrated meal packaged in accordance with the invention has the advantage that when the meal is to be prepared for eating, it is not necessary to measure out carefully a separate volume of water for each item of dehydrated food; instead, water is poured into the container until it is full, no measuring being necessary.

The container can be in the form of a tray and may be separated into compartments by one or more partitions.

The container can be closed by a lid. The lid can have one or more apertures therein through which the water can be added to the compartment or compartments. In the case when there is more than one compartment, there can be one aperture for each compartment, or one aperture can serve some or all of the compartments. The aperture or each aperture in the lid can be partly formed, for example, a line of perforations can define the periphery, or part of the periphery, of the aperture so that when the lid is severed along the line of perforations the aperture is completely formed.

Instead of having the aperture or apertures formed in the lid, the position where the aperture or apertures should be made can be indicated on the lid; the aperture or apertures can then be formed where indicated before the water is added to the compartments. The aperture or apertures can be indicated by embossing or printing on the lid.

At least some of the dehydrated food can be retained in position by water- or heat-soluble edible adhesive. For example, the food or the base of the container or both can be coated with gelatine or fat; or the food can be sprayed with the adhesive.

At least some of the dehydrated food can be retained in position or restrained in its compartment by a film of edible and water-soluble material. For example, a compartment can be completely covered with a film of polyvinyl alcohol.

The container can be packed in a pouch of flexible material, there being a sub-atmospheric pressure inside the pouch so that the pouch is drawn against the container. Preferably, the pouch contains substantially no oxygen but only inert gas, for example nitrogen.

In the case of a container having one or more partitions, the container can be closed by a flexible lid and packed in a pouch as above, the sub-atmospheric pressure in the pouch causing the flexible lid to be pressed against the partition or partitions. In this way the lid can make a good seal against the partition or partitions and prevent any small free particles of dehydrated food migrating from one compartment to another during transport and handling of the packaged dehydrated meal.

The invention will now be described in greater detail with reference to the accompanying diagrammatic drawings, in which.

Figure 1:
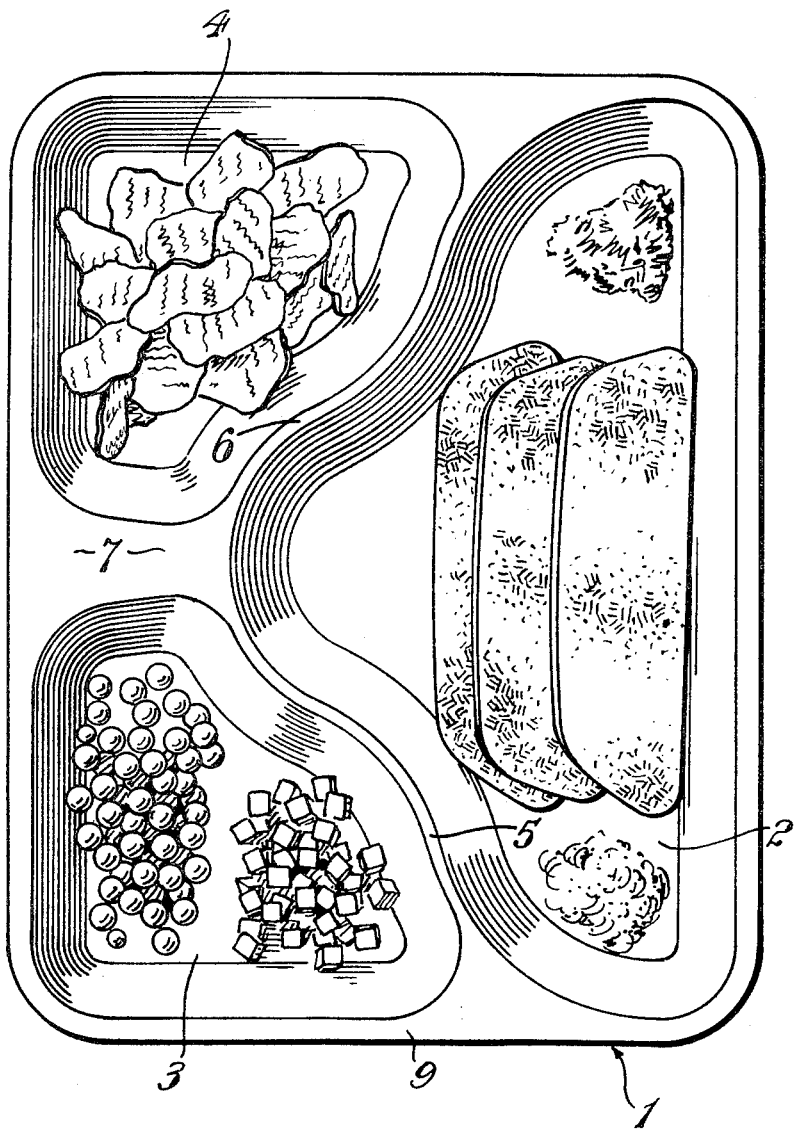
FIGURE 1 shows a plan view of a compartmented tray containing a dehydrated meal in accordance with the invention.
Figure 2:
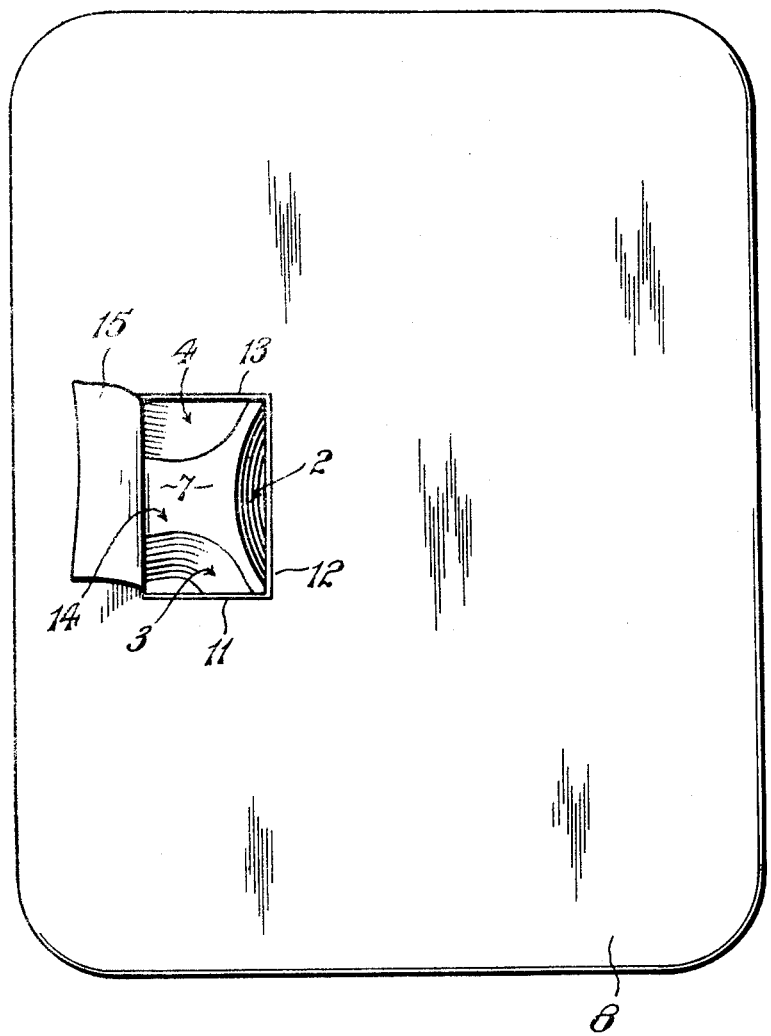
FIGURE 2 shows the tray in FIGURE 1 closed by a lid which has an aperture therein.
Figure 3:
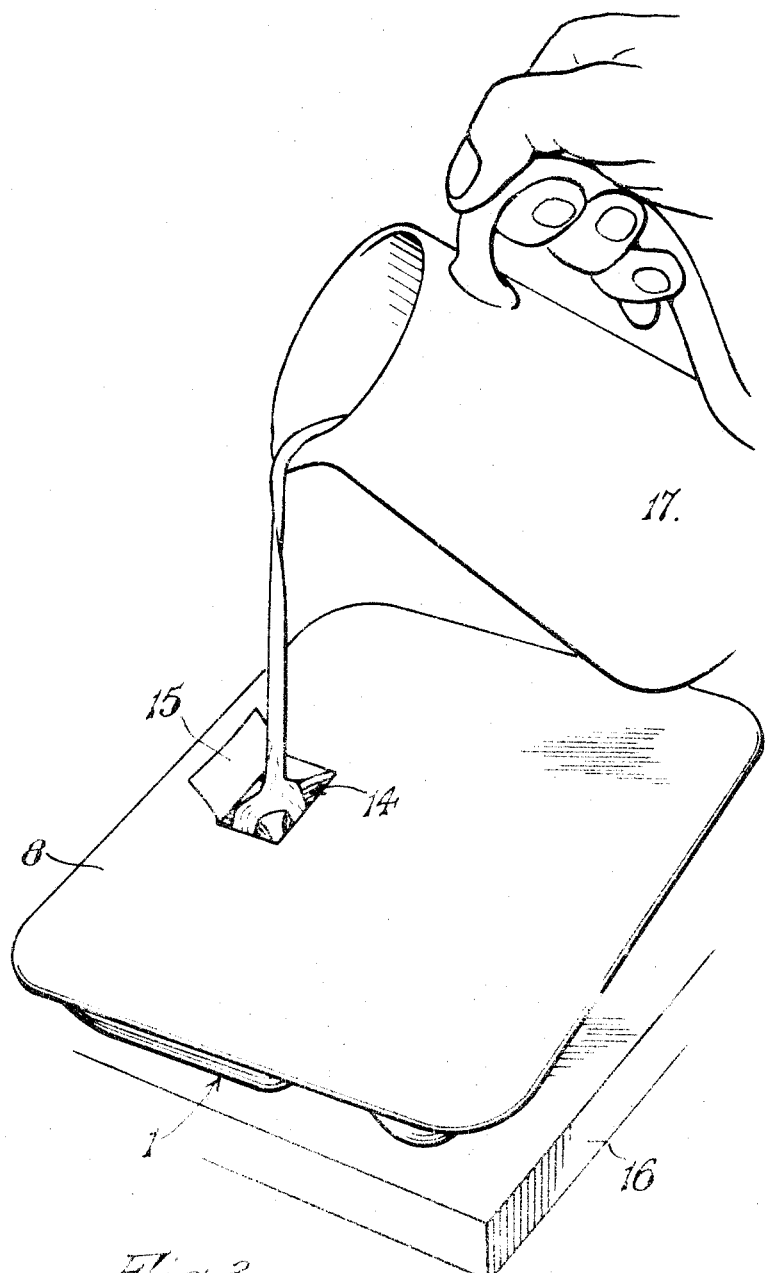
FIGURE 3 is a perspective view showing the container of FIGURE 2 being filled with water.

The tray 1 has three compartments 2, 3 and 4 which are separated by partitions 5, 6 and 7 having inclined side walls. The tray, with the partitions, is formed as a pressing from a sheet of aluminium foil. In the compartments 2, 3 and 4 are disposed separate portions of a dehydrated meal, a detailed example of which is given later. As shown in FIGURE 1, in accordance with Example 1 given later, compartment 2 contains dehydrated sliced meat and other ingredients, compartment 3 contains dehydrated peas and diced carrots, and compartment 4 contains dehydrated potato slices. As shown in FIGURE 2, the tray is covered by a flexible aluminium foil lid 8 which at its periphery is crimped over a rim 9 of the tray. The position of three sides of an aperture 14 are indicated on the lid 8 by embossed lines 11, 12 and 13.

To prepare the dehydrated meal for eating, the lid is cut with a knife or scissors along the three indicated lines 11, 12 and 13, and the flap 15 so formed is bent back to form the aperture 14. The aperture 14 is located over the junction of the partitions 5, 6 and 7, and is so dimensioned that a small part of each compartment 2, 3 and 4 is exposed by the aperture. The tray is placed on a flat surface 16, for example a table or an oven door of the drop-down type, and then water is poured from a jug 17 into the aperture 14 until the components of the tray have been filled up with water. It can easily be seen when the compartments are full since the water will be level with the aperture 14; any excess water added will spill out of the aperture onto the top of the lid 8. The flap 15 is then bent down to close the aperture 14 and any excess water is wiped off the top of the lid. The container is placed in an oven and heated at a pre-determined temperature for a pre-determined time at the end of which it is taken out of the oven and the lid 8 removed. The meal is now ready for serving and can, if desired, be eaten from the tray.

The amount of dehydrated food in each compartment and the volume of that compartment are so chosen that the volume of water required to fill up the compartment whilst the dehydrated food is present is the volume required to rehydrate that food. Thus, when the container is removed from the oven, each item of the meal will be completely rehydrated but there will be no excess water, except where a gravy or sauce is required.

The volume of water required to rehydrate each item of food is constituted by the volume of water the dehydrated food absorbs during rehydration, plus the volume of water that evaporates during heating. As the volume of water that will evaporate depends upon the length and temperature of heating, and as the volume of water that will be absorbed by any item of dehydrated food can depend upon several factors, when formulating a new recipe, including heating instructions, the amount of dehydrated food to be put in any particular compartment is best determined by trial and error.

Rehydration may be completed during the first part of the heating in the oven; then during the rest of the heating the rehydrated product is cooked. By partially or completely pre-cooking some of the items of the meal, the total time of heating required by each item can be controlled. This heating time can be further controlled by selecting the manner in which each item is dehydrated; for example, freeze-dried items will usually rehydrate quicker than air-dried items. By controlling the heating time of each item in these ways, all the items of the meal can be arranged to have substantially the same heating time.

Instead of having only one aperture 14, a separate aperture can be formed for each compartment, water then being poured into each compartment until it is full; although this arrangement requires filling up the container through more than one aperture, no measuring of the water is necessary. Alternatively, the compartments can communicate with each other, for example by means of channels through the partitions, and a single aperture be arranged to communicate directly with one compartment, the other compartment or compartments receiving their water from said one compartment.

The container shown in the drawings is preferably packed in a flexible pouch of suitable thermoplastic material, the container being a close fit in the pouch. During packing, the air is evacuated from the pouch and nitrogen allowed to re-fill the pouch to a pre-determined pressure which is less than atmospheric. The pouch is then sealed. The sub-atmospheric pressure in the pouch causes the pouch to be pressed tightly against the flexible lid 1 which is thereby deformed slightly to make a good seal against the partitions 5, 6 and 7 and against the rim 9 of the tray. This prevents any free small particles of dehydrated food migrating from one compartment to another, or out of the container, during transport and handling of the packaged dehydrated meal. When the meal is to be prepared for serving, the pouch is removed before the water is added.

In the case of a container not having a lid and being packed in a pouch as above, the pouch is drawn against the periphery of the container and any partition in the container, and so prevents loss or migration of any free particles of dehydrated food. The pouch is removed before the water is added, and the container should be closed by a flat cover whilst the food is being heated.

Whenever the container is not provided with a lid, it should be covered by any suitable flat cover whilst being heated, otherwise there is liable to be a greater loss of water due to evaporation than had been allowed for and then the meal may not rehydrate properly.

The following examples illustrate how the invention can be carried out:

*Example 1*

The following table gives details of a dehydrated meal (sliced beef and vegetables) which was packed in the container shown in the drawings:

| Compartment | Ingredients | Method of Preparation | Weight, grams | Compartment Volume, ml. |
|---|---|---|---|---|
| 2 | Sauce mix | | 22 | 234 |
|   | Beef slices | Pre-cooked; air-dried. | 10 | |
|   | Onion pieces | Raw; air-dried | 5 | |
| 3 | Peas | Partially pre-cooked; air-dried. | 15 | 108 |
|   | Diced carrots | do | 5 | |
|   | Salt | | 2 | |
| 4 | Potato slices | Partially pre-cooked; air-dried. | 21 | 108 |
|   | Salt | | 2 | |

When preparing the meal, 380 ml. of water were required to fill up all the compartments. The meal was then heated for 25 minutes in an oven at a temperature of 220° C. It is estimated that the loss of water due to evaporation was 15 ml. from compartment 2, 10 ml. from compartment 3, and 10 ml. from compartment 4.

*Example 2*

The following table gives details of a dehydrated meal (risotto) which was packed in a round aluminium foil dish of 15 cm. diameter having a single compartment only and being covered by a flat aluminium foil lid:

| Ingredients | Method of Preparation | Weight, grams | Compartment Volume, ml. |
|---|---|---|---|
| Quick-cooking rice | Pre-cooked; steam puffed. | 25.0 | 320 |
| Chicken pieces | Pre-cooked; air-dried | 12.0 | |
| Onion pieces | Raw; air-dried | 5.5 | |
| Peas | Partially pre-cooked; air-dried. | 5.0 | |
| Mushroom | do | 4.5 | |
| Green peppers | do | 1.5 | |
| Red peppers | do | 1.5 | |
| Green beans | do | 1.0 | |
| Tomato pieces | do | 1.0 | |
| Salt/spice mix | | 5.2 | |
| Monosodium glutamate | | 3.0 | |
| Vegetable fat | | 3.0 | |

When preparing this meal 240 ml. of water were required to fill up the compartment. The meal was then heated for 25 minutes in an oven at a temperature of 220° C.

What is claimed is:
1. A container for receiving and cooking therein a plurality of different dehydrated foods comprising a cooking receptacle having a plurality of cavities therein, a different dehydrated food expandable on rehydration and cooking in and only partially filling each cavity, a cover closing said receptacle and forming the tops of said cavities, means in said cover for introducing water into said cavities, each cavity with the cover on said receptacle having a capacity with the dehydrated food therein substantially equal to the volume of water required to rehydrate and cook said food in said cavity.

2. The container set forth in claim 1 comprising a water-soluble and edible adhesive retaining said dehydrated food in said cavity.

(References on following page)

References Cited by the Examiner

UNITED STATES PATENTS

| | | | |
|---|---|---|---|
| 1,942,212 | 1/1934 | Heseltine | 99—172 |
| 2,542,206 | 2/1951 | Nichols | 99—189 |
| 2,674,536 | 4/1954 | Fisher | 99—192 |
| 2,828,858 | 4/1958 | Tooke. | |
| 2,863,305 | 12/1958 | Shepherd. | |
| 2,980,540 | 4/1961 | Turpin | 99—172 |
| 3,006,527 | 10/1961 | Lofquist et al. | 229—22 |
| 3,092,501 | 6/1963 | Beck et al. | 99—171 |

A. LOUIS MONACELL, *Primary Examiner.*

ABRAHAM H. WINKELSTEIN, *Examiner.*